(12) United States Patent
Adams et al.

(10) Patent No.: US 8,889,777 B2
(45) Date of Patent: Nov. 18, 2014

(54) ENGINEERED EARTHEN RECREATIONAL AND SPORT SURFACE

(76) Inventors: Lawton Adams, Purdy, NY (US); Karen Leeming, Halesite, NY (US)

(*) Notice: Subject to any disclaimer, the term of this patent is extended or adjusted under 35 U.S.C. 154(b) by 880 days.

(21) Appl. No.: 13/014,858

(22) Filed: Jan. 27, 2011

(65) Prior Publication Data

US 2012/0196969 A1 Aug. 2, 2012

(51) Int. Cl.
*C08L 21/00* (2006.01)
*C08K 3/34* (2006.01)
*B32B 9/00* (2006.01)
*C08K 5/00* (2006.01)

(52) U.S. Cl.
CPC . *C08K 3/34* (2013.01); *C08L 21/00* (2013.01); *C08K 5/0016* (2013.01)
USPC ............ 524/492; 524/445; 524/502; 428/407

(58) Field of Classification Search
USPC ............ 524/492, 445, 502; 427/180; 428/407
See application file for complete search history.

(56) References Cited

U.S. PATENT DOCUMENTS

| 4,337,283 A | 6/1982 | Haas, Jr. |
| 4,501,420 A * | 2/1985 | Dury ............................... 472/92 |
| 4,790,691 A | 12/1988 | Freed |
| 4,819,933 A | 4/1989 | Armond |
| 4,867,614 A | 9/1989 | Freed |
| 5,014,462 A | 5/1991 | Malmgren et al. |
| 5,041,320 A | 8/1991 | Meredith et al. |
| 5,326,192 A | 7/1994 | Freed |
| 5,961,389 A | 10/1999 | Dickinson |
| 2008/0050516 A1 * | 2/2008 | Dickinson ..................... 427/180 |

* cited by examiner

*Primary Examiner* — Ling Choi
*Assistant Examiner* — Ronald Grinsted
(74) *Attorney, Agent, or Firm* — Leason Ellis LLP

(57) ABSTRACT

A composition for use as a sport or recreational surface includes about 88 to 90 percent by weight of a sand blend that is formed of at least three different sands mixed together, the sand blend including a first sand that is represents a majority by weight of the sand blend and has a clay/silt content of at least 1% by weight; about 5-7 percent by weight of a hydrocarbon wax; at least about 2 percent by weight of polymeric material; and at least about 3 percent by weight of rubber, the percentage by weight of each ingredient being based on the total weight of the composition.

19 Claims, No Drawings

ENGINEERED EARTHEN RECREATIONAL AND SPORT SURFACE

TECHNICAL FIELD

The present invention relates to recreation and sports surfaces, and in particular, relates to a loose, particulate mixture that can be applied to an underlying surface or layer to provide a recreation and sport surface, such as running, walking and jumping surfaces particularly suited for use in racetracks, exercise areas and equestrian performance or training rings for horses and ponies, as well as, jogging trails, paths and running areas for humans, canines and vehicles.

BACKGROUND

Artificial sport surfaces are used throughout the world and in many different applications. For example, artificial surfaces can be used in arenas in the form of turf or playing surfaces for such sports as football, soccer, track and field and tennis to name just a few. In addition, there is another field where artificial surfaces are used, namely, in equestrian applications, such as racetracks, exercise areas and equestrian performance or training rings for horses and ponies. Depending upon the specific application and end use (sport, etc.), the composition and characteristics of the artificial surface will vary. For example, for the game of football or soccer, the artificial surface resembles natural grass, while for the sports of tennis and track and field, the surface is a more hardened surface, such as a dirt surface, clay surface, etc.

As a result of the widespread use in many different applications, there are numerous artificial surfaces on the market.

For instance, U.S. Pat. No. 5,326,192 to Freed, which is hereby incorporated in its entirety by reference, teaches a method of improving a turf surface by adding about 0.1 to 0.5 percent by weight of synthetic fibers into areas that contain turf or soil such that the synthetic fibers anchor the turf beneath the surface and mix with the turf above the surface. Similarly, Freed has invented two other soil reinforcement methods; U.S. Pat. Nos. 4,790,691 and 4,867,614, both to Freed, which are hereby incorporated in their entirety by reference, disclose the reinforcement of soil by mixing together soil and about 0.1 to 0.5 percent by weight of man-made fiber forming substances and/or fiberglass ('614) or thermoplastic polymers and/or fiberglass ('691).

U.S. Pat. No. 4,501,420 to Dury, which is hereby incorporated in its entirety by reference, discloses a method of making a sport surface by laying at least one flexible, water-permeable material containing sand on a water-permeable surface and placing a sheet or resilient material on top of it.

U.S. Pat. No. 4,819,933 to Armond, which is hereby incorporated in its entirety by reference, discloses a sport surface comprising a layer of sand mixed with less than 1.0% by weight of long synthetic fibers, which is laid on top of a prepared drainage base. The Armond surface requires copious amounts of water on a frequent basis in order to prevent the surface from drying out and becoming hard and non-resilient.

U.S. Pat. No. 5,014,462 to Malmgren et al., which is hereby incorporated in its entirety by reference, discloses a method of preparing soil to improve its porosity and reduce it from being compacted. The method comprises loosening the top layer of soil and mixing at least about 10% by volume of solid rubber particles and grass seed into the soil layer.

U.S. Pat. No. 5,041,320 to Meredith et al., which is hereby incorporated in its entirety by reference, teaches a sport surface which comprises a pile fabric and a layer of rubber coated mineral grains (e.g., sand) in which the pile is partly submerged.

U.S. Pat. No. 4,337,283 to Haas, Jr., which is hereby incorporated in its entirety by reference, discloses a synthetic turf playing surface which comprises a subsurface layer (e.g., concrete, clay, dirt, etc.), a moisture barrier layer, a pile fabric layer and a compacted top-dressing layer.

Notwithstanding the aforementioned advancements in sport surfacing, there remains a need for a sport and recreational surface which is stable, water-resistant, easily drained, easily and inexpensively manufactured, resistant to compaction, and hard enough to provide resistance, yet resilient enough to also provide a cushion.

SUMMARY

Accordingly, it is an object of the present invention to provide a sport and recreational surface which improves over the prior art surfacing compositions.

It is a further object of the present invention to provide a sport surface which is resistant to compaction and water retention such as to increase the availability of the surface to be safely used by athletes and horses.

It is yet another object of the present invention to provide a sport surface having good shock absorption.

It is still another object of the present invention to provide a sport surface which can be easily and inexpensively prepared and maintained, and which has a longer service life than conventional artificial surfaces.

It is also an object of the present invention to improve the appearance and performance characteristics of turf surfaces.

It is still another object the present invention to provide a sport surface which may be prepared over a variety of surfaces including cement, dirt, clay, turf and the like.

According to one embodiment, a composition for use as a sport or recreational surface includes: greater than about 86 percent by weight of a sand blend that is formed of at least three different sands mixed together; less than or about 7 percent by weight of a hydrocarbon wax; at least about 2 percent by weight of polymeric material; and at least about 3 percent by weight of rubber or a blend of rubber with another material, the percentage by weight of each ingredient being based on the total weight of the composition.

In another embodiment, a composition for use as a sport or recreational surface includes about 88 to 90 percent by weight of a sand blend that is formed of at least three different sands mixed together, the sand blend including a first sand that is represents a majority by weight of the sand blend and has a clay/silt content of at least 1% by weight; about 5-7 percent by weight of a hydrocarbon wax; at least about 2 percent by weight of polymeric material; and at least about 3 percent by weight of rubber or a blend of rubber with another material, the percentage by weight of each ingredient being based on the total weight of the composition.

In yet another embodiment, a method of making a sport or recreational surface includes the steps of: (a) admixing about 88 to 90 percent by weight of a sand blend; at least about 2 percent by weight of polymeric material; and at least about 3 percent by weight of rubber or a blend of rubber with another material, wherein the sand blend is formed of at least three different sands mixed together, the sand blend including a first sand that is represents a majority by weight of the sand blend and has a clay/silt content of at least 1% by weight; (b) heating about 5-7 percent by weight of a hydrocarbon wax until the wax has liquefied; (c) admixing the liquid wax into the mixture of step (a) to form a wax coated particulate composition, the percentage by weight of each ingredient being based on the total weight of the composition; (d) cooling the particulate composition of step (c); (e) optionally, breaking up the particulate composition into smaller particulates by hand or mechanically; and (f) depositing the cooled composition of steps (d) or (e) over an underlayer which is capable of drawing water away from an area.

Applicant has discovered that synergistic and unexpected results are obtained when the composition of the present invention includes sand in a weight percent of greater than 86 and preferably about 88 to about 90 and hydrocarbon wax in a range of about 5 to 7 by weight. Unlike other surface materials that have higher percentages by weight of synthetic materials compared to sand, the composition of the present invention has a higher weight percentage of sand due to the unique characteristics that are obtained by using a sand blend where the majority of the sand is a sand that has an appreciable amount of clay/silt content (e.g., greater than 1% by weight). The unique sand blend of the present invention provides binding properties and therefore, the overall amount of hydrocarbon wax can be reduced while not impacting the characteristics and performance of the end product. In addition, the reduction in hydrocarbon wax also advantageously reduces temperature sensitive of the end product.

These and other aspects, features and advantages shall be apparent from the accompanying Drawings and description of certain embodiments of the invention.

DETAILED DESCRIPTION OF CERTAIN EMBODIMENTS OF THE INVENTION

The present invention relates to a loose, particulate mixture which can be applied over an easily drained underlayer or another base surface to provide an outstanding sport and recreational surface. More specifically, the invention provides running, walking and jumping surfaces particularly suited for use in racetracks, exercise areas, and equestrian performance or training rings for horses and ponies. The present invention can also be used in jogging trails, paths and running areas for humans, dogs, vehicles, motorcycles and the like.

In addition, the present invention provides an environmentally safe, non-toxic, and non-irritating sport and recreational surface. More particularly, the present invention creates an ideal equestrian footing which reduces shock and provides cushioning to the feet of running and jumping horses, while still providing sufficient stability to their rear legs so that they may increase and maintain their speed. The surface is stable, non-slip, dust-resistant, water-resistant and easily drained. Unlike natural track surfaces, the compositions of the present invention require minimal irrigation, thereby reducing the cost of water, machinery and manpower resources. Furthermore, the surface requires relatively little maintenance such as grading and harrowing. Moreover, the surface disclosed herein will be available for use more often than conventional surfaces during the rainy season. Also, the excellent drainage properties reduce the likelihood of injuries to athletes or animals who run on the surface.

The ingredients employed in the compositions of the instant invention are low cost, natural (e.g., sand) and/or synthetic (e.g., polymeric) materials. Thus, the invention not only provides an outstanding surface for sport and recreational uses.

The present invention can be thought of as providing engineered earthen surfaces that have widespread use in a number of different applications and are particularly suited for equestrian applications and provide a stable composition that has a number of other advantageous properties.

The present invention comprises a sand blend, a hydrocarbon wax and a combination of materials selected from the following classes of ingredients: (i) polymeric materials, including fibers and particles, and (ii) rubber, preferably virgin rubber. As is known, virgin rubber is a new rubber compound that has not been previously used and recycled. According to one embodiment and as described in detail herein, the sand blend, chopped fibers of synthetic polymers, and virgin rubber are intimately mixed, essentially in a dry state, and substantially uniformly coated with a thin film of hydrocarbon wax. The ingredients are essentially dry and may be mixed in any suitable manner consistent with the amount of surface material desired such as in a cement mixer, or a cattle feed mixer or any other device that performs the intended function and yields the engineered earthen surface of the present invention. The specific ingredients are chosen such that the final composition is weather resistant and long lasting, and resistant to degradation when exposed to the conditions of normal outdoor use and alternatively and according to another embodiment, indoor use.

In one embodiment of the present invention, an engineered earthen surface is provided in the form of a particulate composition for use as a sport or recreational surface comprising: A. about 84-91 percent by weight of a sand blend; B. about 5-8 percent by weight of a hydrocarbon wax, and C. about 4-9 percent by weight of materials selected from the following classes of ingredients: (i) polymeric materials (e.g., fibers, solid pellets, etc.) and (ii) rubber or a blend of rubber and another material, preferably virgin rubber.

The sand blend and polymeric materials and rubber are added and mixed together in a mixer or suitable device. All of the ingredients are essentially dry solids. The intimate dry mixture is then mixed with a suitable hydrocarbon wax such as paraffin wax or a mixture of waxes. These waxes are readily available from a variety of commercial sources. They usually comprise high molecular weight materials and are preferably mineral waxes derived from petroleum by-products, for example, dewaxing light lubricating oil stocks (e.g., paraffin waxes). The wax is first heated to liquify it and the melted wax is coated in a substantially uniform layer over each ingredient. The coating is typically achieved by spraying the melted wax over the essentially dry mixture as it is being stirred or tumbled in a suitable mixer, for example, in the same mixer used initially to intimately mix the essentially dry ingredients.

As used herein, the term "hydrocarbon wax" refers to any number of different hydrocarbon waxy or jelly-like products that are derived from petroleum. For example, the hydrocarbon wax can be a paraffin based wax, it can be a petrolatum (a solid petroleum derivative commonly known as petroleum jelly) or other hydrocarbon based petroleum derivative that is suitable in the practice of the present invention. It will also be appreciated that other similar materials can be used so as long the intended results is achieved and the material acts as a binding agent.

The wax can be of any suitable nature provided that it has a sufficiently high enough melting point. The wax is chosen to have a relatively high melting point such that it does not melt or soften to any substantial extent during use, keeping in mind that under summer conditions the sport or recreational surface may reach temperatures well in excess of 100° F. Accordingly, the melting point of the wax should be in excess of 120° F. and under some circumstances above 170° F. Generally, most waxes do not have a sharply defined melting point, but rather, melt over a range of 10 to 30° F. In any event, the melting point must be sufficiently high such that the sport or recreational surface will not become sticky and the particulate material will not unduly clump and/or stick together when cooled. The wax coating serves to seal and protect the particulate materials from environmental influences and to impart a degree of slip so that the desired cushioning is achieved when initially cooled after coating. The coated particulate material of this invention may solidity into lumps or clumps, but these solids are easily broken up by hand or with a powered mixer. Once broken up, the finished mixture will retain its particulate nature.

One suitable and preferred hydrocarbon wax is commercially available from The International Group, Inc. under the trade name Petrofibe 201 (Industrial Grade). Petrofibe 201 is an industrial grade of petrolatum. Petrolatum waxes are natural, mineral waxes from petroleum that are microcrystalline in nature and a semi-solid at room temperature. Petrofibe 201 has a drop melting point between about 130-160° F. (according to ASTM D127). While Petrofibe 201 is one exemplary wax or wax-like product, it will be appreciated that any number of other waxes are available and can be used in the compositions of the present invention so long as they are suitable for use in view of the intended applications described herein. In particular, the hydrocarbon wax acts as a binding agent and provides elasticity to the overall composition (engineered earthen surfaces) of the present invention.

The compositions of the present invention can be advantageously laid down on the ground over a layer of material that will provide good drainage. While the surface can be laid over practically any type of surface, for example, cement, dirt, clay and turf, it is preferable for indoor application to lay it over cement or dirt to maximize the drainage benefits of the present invention. In many indoor applications, the surface is laid over cement. In use, rain or irrigation water quickly penetrates and drains through the composition. This is an advantageous characteristic, and to be certain that the water will completely drain off the surface, an aggregate layer or other underlayment of, for example, crushed or broken gravel, stone, or other aggregate (e.g., quarry, granite or limestone fines or dust), or a mixture thereof, can be used for optimal drainage. To provide enhanced drainage functions, the underlayer should can have a depth of about 3-7 inches and be full of 1-5 inches of aggregate, such as crushed washed stone which is ¼ to 2 inches in diameter. In addition, a pipe can be laid down with the crushed stone to facilitate rapid egress of any water. The size and uniformity of the drainage underlayer are not critical so long as drainage is accomplished and the particulate mixture of the invention does not significantly penetrate the drainage layer. Other grounds surface compositions are equally possible.

The drainage underlayer can occupy the same linear dimensions in width and length as the sport surface. However, it is contemplated that the underlayer can be longer, shorter, wider, or thinner than the sport surface so long as the function of drainage is not significantly compromised. The composition is spread over the drainage underlayer to a suitable depth of at least 4 inches, and preferably at least 5 to 6 inches. The thickness can be increased beyond these limits, but considerations of increased cost versus diminution of enhanced benefits impose practical limits on thickness. The compositions of the present invention can be used for long periods of time, for example, up to about 4 to 10 years, but eventually may require maintenance (e.g., refurbishing). Usually, the wax, and not the particulate materials, degrade and the original particles can simply be recoated with wax in a suitable mixing device.

In addition, a water-permeable separator layer, such as a suitable textile, net mesh, other porous membrane layer, or a mixture thereof can be interposed between the sport surface and the drainage layer. The separator layer can be a synthetic. In one embodiment of the present invention, a Geotextile membrane separates the particulate materials of the invention, especially the sand, from the drainage materials (e.g., crushed stone). Covering the crushed stone with a porous membrane prevents the intermixing of the surface layer with the drainage area. Without a separator layer, the sand content of the surface layer can ultimately leach into the crushed stone, thereby reducing drainage and modifying the composition of the surface layer, or at least that portion which is closest to the crushed stone. Suitable separator materials are chosen based on the particle size of the surface composition, its durability and its resistance to deterioration. Any material is satisfactory so long as it allows water to pass through it, while blocking the passage of any particulate matter.

The compositions of the present invention advantageously comprise the following ingredients in the stated ranges by weight, based on the total weight of each composition, although volume measurements will also work. It will be appreciated that the below percentages are merely exemplary of certain embodiments and are not limiting of the scope of the present invention since some variation can occur.

Example 1

| Ingredient | Percent by weight |
| --- | --- |
| Sand Blend | 84-94 |
| Hydrocarbon Wax (e.g., Petrolatum) | 4-8 |
| Polymeric Material | 1.5-4 |
| Rubber or Rubber Blend | 0-7 |

Example 2

| Ingredient | Percent by weight |
| --- | --- |
| Sand Blend | 88-90 |
| Hydrocarbon Wax (e.g., Petrolatum) | 5-7 |
| Polymeric Material | 1.5 |
| Rubber or Rubber Blend | 3 |

Example 3

| Ingredient | Percent by weight |
| --- | --- |
| Sand Blend | Greater than 86 |
| Hydrocarbon Wax (e.g., Petrolatum) | At least 5 |
| Polymeric Material | At least 2 |
| Rubber or Rubber Blend | At least 3 |

Unlike other sport surfaces, such as the one described in U.S. Pat. No. 5,961,389, the sand employed in the compositions of the present invention is in the form of a blend of a plurality of different sands and more specifically, the blend of sand is formed of three different sands that are blended together to provide the synergistic effects described herein.

For example and according to one embodiment, the sand blend is a blend of the following sands: sand A; sand B; and sand C, in which the three sands are different from one another and thus have different characteristics and physical properties.

Sand A is a sand that is commercially available from McConnellsville Sands & Material, Inc. of Blossvale, N.Y. The sand is a silica sand that has the following characteristics: a silicon dioxide ($SiO_2$) content of about 97.13% by weight and a silt/clay content of about 1.0% or greater by weight. For example, sand A can have a silt/clay content of about 1.03%. Alternatively, the silt/clay content can be greater than 1.2%. The high silt/clay content of sand A relative to other sands provides a number of advantageous properties that Applicant has discovered are advantageous as a sports surface including that it acts as a binder for the composition, similar to how the hydrocarbon wax acts, and as a result, less hydrocarbon wax can be used in the present composition compared to other synthetic sports surfaces.

The screen size analysis (by weight) is as follows for sand A (U.S. mesh screen): 0.76% retained on No. 20, 4.39% retained on No. 30, 7.63% retained on No. 40, 12.40% retained on No. 50, 23.28% retained on No. 70, 28.05% retained on No. 100, 18.32% retained on No. 140, 4.96% through No. 200 and 0.19% retained on No. 270. Sand A has a subangular grain shape.

Sand B is a sand that is commercially available from Unimin Corporation under the name Granusil mineral fillers. Sand B is produced from high purity quartz sands and has the following characteristics: a silicon dioxide ($SiO_2$) content of about 99.65% by weight. Sand B also has a bulk density, loose of about 92-95 $lb/ft^3$ and a bulk density, compacted of about 98-100 $lb/ft^3$. Sand B has a subangular grain shape.

The screen size analysis (by weight) is as follows for sand B (U.S. mesh screen): 0.1% retained on No. 30, 3.1% retained on No. 40, 21.7% retained on No. 50, 33.1% retained on No. 70, 26.8% retained on No. 100, 12.6% retained on No. 140, 2.4% retained on No. 200, 0.2% retained on pan.

Sand C is a sand that is commercially available from Hutcheson Sand & Mixes of Huntsville, Ontario, Canada under the trade name W-90 Hutch/W or Whibco P90. Sand C is produced from high purity quartz sands and has the following characteristics: a silicon dioxide ($SiO_2$) content of about 99.30% by weight. The W-90 version of sand C also has an apparent density of about 89.69 $lb/ft^3$ and a compact density of about 106.3 $lb/ft^3$.

The screen size analysis (by weight) is as follows for Sand B (Whibco P90 version) (U.S. mesh screen): 99.91% through No. 20, 99.62% through No. 30, 96.45% through No. 40, 82.50% through No. 50, 63.83% through No. 70, 47.37% through No. 100, 23.94% through No. 140, 6.90% through No. 200, 2.07% through No. 270, and 0.00% through pan.

The sand can be pre-heated to dry it before the mixing step because too much moisture in the sand can reduce the capability of the wax to coat the sand. The average particle size (in diameter) of the sand may vary widely, but it is preferred that the sand will pass substantially through a number 7 U.S. mesh screen while being retained substantially on a number 200 U.S. mesh screen.

In accordance with the present invention, the sand component is actually a blend of sands A, B and C to provide a custom sand blend that provides a number of advantages, as described herein. The precise makeup of the blend can vary depending upon the precise application and in particular, the makeup can vary depending upon whether the product is meant for indoor use or whether the product is meant for outdoor use. In all applications, sand A (e.g., McConnellsville) is present in a greater percentage by weight relative to the other two sands B and C. In other words, the sand, in this case sand A, with the higher clay/silt percentage and once which is preferably greater than 1.0% by weight is present in a greater amount relative to the other sands.

Example 4

For example, in one embodiment of the present invention, the sand blend for indoor applications is follows:

| Sand Type | Percentage of Sand Blend by Weight |
|---|---|
| Sand A | About 60% |
| Sand B | About 20% |
| Sand C | About 20% |

Example 5

In another embodiment of the present invention, the sand blend for outdoor applications is follows:

| Sand Type | Percentage of Sand Blend by Weight |
|---|---|
| Sand A | About 50% |
| Sand B | About 30% |
| Sand C | About 20% |

It will be appreciated that in both of the above application as well as other embodiments, sand A represents a majority, by weight, of the sand in the sand blend. In addition, variations to the aforementioned values are within the scope of the present invention.

In addition, one will appreciate that unlike other sport surfaces, the percentage of sand, in this case a sand blend, is greater than in other conventional artificial sport surfaces and more specifically, the percent, by weight, of sand in the composition of the present invention is preferably greater than 86% and is more preferably about 88% or greater and most preferably is between about 88% and about 90% as opposed to conventional artificial surfaces that include more synthetic materials.

As previously mentioned, the other component of the engineered earthen surface of the present invention is a combination of materials selected from the following classes of ingredients: (i) polymeric materials and (ii) rubber or a rubber blend, such as virgin rubber.

Polymeric Materials Including Fibers and Particles

The polymeric material that can be used to form the composition of the present invention can come in any number of different forms. For example, the polymeric material can be polymeric fibers. Polymeric fibers have wide spread use in a vast number of products and can include a wide range of different polymeric fibers that have different chemistry and different characteristics.

One class of polymeric fibers is polyester fibers. Polyester is a category of polymers which contain the ester functional group in their main chain. Although there are many polyesters, the term "polyester" as a specific material most commonly refers to polyethylene terephthalate (PET). Polyesters include naturally-occurring chemicals, such as in the cutin of plant cuticles, as well as synthetics through step-growth polymerization such as polycarbonate and polybutyrate. Natural polyesters and a few synthetic ones are biodegradable, but most synthetic polyesters are not.

Fabrics woven from polyester thread or yarn are used extensively in apparel and home furnishings, from shirts and pants to jackets and hats, bed sheets, blankets and upholstered furniture. Industrial polyester fibers, yarns and ropes are used in tire reinforcements, fabrics for conveyor belts, safety belts, coated fabrics and plastic reinforcements with high-energy absorption. Polyester fiber is used as cushioning and insulating material in pillows, comforters and upholstery padding. Thus, one form of polyester is as a knit fabric.

In industry, polyester is a synthetic polymer made of purified terephthalic acid (PTA) or its dimethyl ester dimethyl terephthalate (DMT) and monoethylene glycol (MEG).

In accordance with the present invention, the polymeric material can include polyester as a component. The polyester can be provided in any number of different forms including but not limited to fibers and knit fabrics that are then processed to form small pieces thereof or a combination of both that can be mixed with the other components. In accordance with the present invention, the polymeric material that is added to the sand and hydrocarbon wax is in the form of pieces of a polyester knit fabric and/or polyester fibers. Suitable polyester knit fabric and polyester fibers can be obtained from any number of different commercial sources.

For example and according to one embodiment, the polyester that is used in the form of a polyester geotextile material and in particular, is in the form of a material that is commonly known as German Geo Textile (GGT). In geo textile form, the material is in the form of small pieces of textile material. GGT provides the following benefits: reduces dust, has high water storage capability, provides optimal impact resistance, offers higher slide strength and additional stability, prevents packing, and extends the lifetime of the arena surface. It will also be appreciated that GGT is also provided in a footing fiber form that is the same fiber that is used to make the textile fabric for GGT-footing Geo (textile). The fibers are typically between 1-2 inches long and work lie a root system through the sand. The footing fibers can be used with the GGT-footing geo. The use of footing fibers increases impact and shear resistance. In yet another form. GGT-footing elastic fibers can be used as an additive and in combination with the other GGT product(s). GGT-footing elastic fibers are small cut and elastic fibers. The fibers are about ½ inch long. The footing elastic fibers are optimizes shear resistance and makes the footing flexible and springy and is used in certain settings.

GGT products are commercially available from Polysols Inc. (a subsidiary of Germany-based Polywert GmbH) under the above described product names. Generically, the GGT footing geo is known as polyester chopped NW.

GGT footing geo typically comes in irregular shapes cut pieces that can have a length between about ¼" to about 2" and a width between about ¼" and about 1".

The polymeric material that is used in the present composition can be entirely made up of GGT products and in particular, can be GGT footing geo (or a combination of footing geo with the other GGT products).

In another embodiment, the polymeric materials used in the present invention are in the form of a GGT product that is combined with another polymeric material so as to form a blend. For example, a blend can be formulated with a GGT product (i.e., GGT footing geo) and another polyester based product.

For example and according to one embodiment, another polyester product that can be used is a polyester knit fabric is available from Polynova Composites of Milford, Mass. under the trade name HIFLUX 90 PET.

This product from Polynova is formed of high tenacity polyester fiber and is available in rolls that can have the following dimensions and properties: areal weight of 1.26 oz/ft$^2$, a thickness of 0.056 inches, roll width of between 60 inches to 160 inches. The Polynova product can be cut to size and in particular, cut into little pieces that are blended with the other ingredients. The polyester knit fabric can have a 2 mm cut and can be cut to have a length of between 1" and 1.5" strand fiber length.

Compared to the GGT footing geo, the product from Polynova is more a fluff-like material as opposed to a tight knit like the GGT footing geo product.

Rubber or Rubber Blend

In contrast to other artificial surfaces, the composition of the present invention preferably uses virgin rubber as opposed to recycled components, including recycled tire cord and tire fibers. It will be appreciated that tire cord and tire fiber materials are quite different than virgin rubber in both origin and structure. More specifically, tire cord represents a reinforcing material that is used in tires and tire fibers are a waste byproduct of a scrap tire treatment process. In contrast, virgin rubber is new rubber material that is not a byproduct of a waste or recycling process.

Virgin rubber can be provided in any number of different forms (e.g., different shapes and sizes) and can be obtained from any number of different sources. As with the other components, the virgin rubber is preferably provided as cut solid materials, such as cut solid material (e.g., pellets or the like). The rubber chunks or segments can be made by cutting a manufactured rubber sheet into various sized chunks or exists as a by-product of a molding or manufacturing process, such tire manufacturing (however while the product is a by-product of a process, the rubber has not been used in an end use and contaminated by coming into contact with other items). While the rubber can be provided in any number of different sizes (dimensions) and shapes so long as they are suitable for use for the intended purpose, exemplary rubber components can be about ⅜" rubber pieces. The rubber pieces can come in various shapes and typically, the rubber pieces that are used have irregular cut shapes and come in different sizes. For example, the width can be from about ¼ to about ½ inch and the length can be between about ¾" to 1½".

One source of rubber is Goodyear and one exemplary Goodyear product is known as cured rubber dust.

It will also be appreciated that other types of rubber can be used in the composition of the present invention; however, it is intended that no matter what form it is in, the rubber is preferably not a byproduct of a recycling process or the like.

It will be appreciated and will be understood by the following Examples that the makeup of the polymeric materials used in the composition of the present invention can vary based on a number of factors including the intended application, as well as cost considerations.

In an alternative embodiment, the composition can be formed of a rubber blend that not only includes the above described rubber pieces but also includes one or more additional material. For example, the rubber blend can be formed of rubber pieces and one or more polymeric material. As mentioned herein, polymeric materials can come in any number of different forms, including fibers, knits, pellets, particles, etc. One type or class of polymers is polyolefin materials. A polyolefin is a polymer produced from a simple olefin (also called and alkene with the general formula $C_nH_{2n}$) as a monomer. For example, polyethylene is the polyolefin produced by polymerizing the olefin ethylene. Polypropylene is another polyolefin produced by polymerizing the olefin propylene. Today, a polyolefin is also commonly referred to as a polyalkene.

In accordance with the present invention, the rubber blend can include a polyolefin as a component and in particular, it can include polypropylene. The polypropylene can be provided in any number of different forms including but not limited to fibers and solids that can be mixed with the rubber and with the other components that form of the composition. In accordance with the present invention, the polymeric material that is added to rubber pieces is in the form of polypropylene pellets or the like. Suitable solid polypropylene can be obtained from any number of different commercial sources. For example and according to one embodiment, polypropylene pellets or the like are available from Exxon Mobil Company of Houston, Tex. under the trade name POLYPROPYLENE HOMOPOLYMER—PP2000/3000/4000/5000 series.

While the above exemplary material is in the form of pellets, it will be appreciated that the material can take other forms, including chopped fibers, segments, etc. that are suitable for mixing with the rubber. The use of polyolefin materials in the rubber blend reduces the overall costs since the polyolefin material is less expensive compared to rubber. Thus, in certain embodiments where cost is a consideration, polyolefin material or other suitable polymeric materials can be used with the rubber pieces for formulate a rubber blend.

When a rubber blend is used, the polyolefin material, such as polypropylene pellets, can be present from about 0 to 3% by weight of the total composition.

Example 6

The composition of this example is prepared from the following ingredients to provide the following percents by weight in the final particulate product (engineered earthen surface product):

| Ingredient | Percentage by Weight |
| --- | --- |
| Sand | 88 |
| Hydrocarbon wax | 7 |
| GGT - footing geo (geo textile) | 1 |
| Polyester material | 1 |
| Virgin Rubber or rubber blend | 3 |

The sand employed in Example 4 is a mixture (blend) of sands A, B, or C, as defined hereinbefore, and can be provided in the proportions set forth in Examples 4 and 5 depending upon whether the composition is intended for indoor or outdoor applications.

Example 7

The composition of this example is prepared from the following ingredients to provide the following percents by weight in the final particulate product (engineered earthen surface product):

| Ingredient | Percentage by Weight |
| --- | --- |
| Sand | 88 |
| Hydrocarbon wax | 7 |
| GGT - footing geo (geo textile) | 2 |
| Virgin Rubber or rubber blend | 3 |

The sand employed in Example 7 is a mixture (blend) of sands A, B, or C, as defined hereinbefore, and can be provided in the proportions set forth in Examples 4 and 5 depending upon whether the composition is intended for indoor or outdoor applications.

Example 8

The composition of this example is prepared from the following ingredients to provide the following percents by weight in the final particulate product (engineered earthen surface product):

| Ingredient | Percentage by Weight |
| --- | --- |
| Sand | 90 |
| Hydrocarbon wax | 5 |
| GGT - footing geo (geo textile) | 2 |
| Virgin Rubber or Rubber blend | 3 |

The sand employed in Example 8 is a mixture (blend) of sands A, B, or C, as defined hereinbefore, and can be provided in the proportions set forth in Examples 4 and 5 depending upon whether the composition is intended for indoor or outdoor applications.

Example 9

The composition of this example is prepared from the following ingredients to provide the following percents by weight in the final particulate product (engineered earthen surface product):

| Ingredient | Percentage by Weight |
| --- | --- |
| Sand | 90 |
| Hydrocarbon wax | 5 |
| GGT - footing geo (geo textile) | 1 |
| Polyester material | 1 |
| Virgin Rubber or rubber blend | 3 |

The sand employed in Example 9 is a mixture (blend) of sands A, B, or C, as defined hereinbefore, and can be provided in the proportions set forth in Examples 4 and 5 depending upon whether the composition is intended for indoor or outdoor applications.

Example 10

The composition of this example is prepared from the following ingredients to provide the following percents by weight in the final particulate product (engineered earthen surface product):

| Ingredient | Percentage by Weight |
| --- | --- |
| Sand | 88 |
| Hydrocarbon wax | 7 |
| GGT - footing geo (geo textile) | .5 |
| Polyester material | 1.5 |
| Polypropylene | .5 |
| Virgin Rubber | 3 |

The sand employed in Example 10 is a mixture (blend) of sands A, B, or C, as defined hereinbefore, and can be provided in the proportions set forth in Examples 4 and 5 depending upon whether the composition is intended for indoor or outdoor applications.

Example 11

The composition of this example is prepared from the following ingredients to provide the following percents by weight in the final particulate product (engineered earthen surface product):

| Ingredient | Percentage by Weight |
| --- | --- |
| Sand | 88 |
| Hydrocarbon wax | 6 |
| GGT - footing geo (geo textile) | 2 |
| Polyester material | 1 |
| Virgin Rubber | 3 |

The sand employed in Example 11 is a mixture (blend) of sands A, B, or C, as defined hereinbefore, and can be provided in the proportions set forth in Examples 4 and 5 depending upon whether the composition is intended for indoor or outdoor applications.

Once again, while virgin rubber is set forth in the above examples, it will be appreciated that the rubber can be from another source.

Applicant has discovered that synergistic and unexpected results are obtained when the composition of the present invention includes sand in a weight percent of greater than 86 and preferably about 88 to about 90 and hydrocarbon wax in a range of about 5 to 7 by weight. Unlike other surface materials that have higher percentages by weight of synthetic materials compared to sand, the composition of the present invention has a higher weight percentage of sand due to the unique characteristics that are obtained by using a sand blend where the majority of the sand is a sand that has an appreciable amount of clay/silt content (e.g., greater than 1% by weight). The unique sand blend of the present invention provides binding properties and therefore, the overall amount of hydrocarbon wax can be reduced while not impacting the characteristics and performance of the end product.

The sand, polymeric material, and rubber or rubber blend (e.g., virgin rubber) are thoroughly mixed together to form an intimate and essentially uniform mixture of essentially dry ingredients.

The petroleum hydrocarbon wax used in this example is heated and melted to above a predetermined temperature above the melting point. The melted (liquified) wax is then intimately mixed with the remaining ingredients to coat them. The wax is characterized as a paraffin wax derived from petroleum by-products. It is typically dark brown to black in color and is insoluble in water. Mixing is continued until essentially all of the particulate ingredients are covered with a thin wax coating.

The mixture is then cooled while mixing, and the wax is allowed to solidify. When cooled, some of the particulate materials may stick together, but they are easily broken up into smaller particulates either by hand or mechanically. The resulting mixture can then deposited over a bed of crushed stone which can be approximately 6 inches in thickness (for drainage purposes). The mixture is applied to form a substantially uniform layer that can have a thickness of about 5 to 6 inches. Thus, the whole sport surface (top layer over crushed stone layer) can be about 10 to 13 inches thick. Before depositing the mixture of the invention over the crushed stone, a textile separator (e.g., Geotextile) can be advantageously placed over the stone to keep the sand and other particulate material from filtering down into the stone area.

The resulting surface is elegantly suited, for example, as a stable, weather resistant artificial horse racing or equestrian track providing easy drainage, low dust, ease of maintenance and excellent cushioning. In fact, the combination of the resilience of the track and its drainage is superior to any other similar type of track on the market. The surface can also be used for exercise yards, show rings, and other locations where the characteristics of the disclosed invention are desired.

While the invention has been described in connection with certain embodiments thereof, the invention is capable of being practiced in other forms and using other materials and structures. Accordingly, the invention is defined by the recitations in the claims appended hereto and equivalents thereof.

What is claimed is:

1. A composition for use as a sport or recreational surface comprising:
    greater than about 86 percent by weight of a sand blend that is formed of at least three different sands mixed together;
    less than or about 7 percent by weight of a hydrocarbon wax;
    at least about 2 percent by weight of polymeric material; and
    at least about 3 percent by weight of rubber, the percentage by weight of each ingredient being based on the total weight of the composition;
    wherein the sand blend is mixed with the hydrocarbon wax, the polymeric material and the rubber to form the composition.

2. The composition of claim 1, wherein the sand blend comprises between about 88 and about 90 percent by weight.

3. The composition of claim 1, wherein the sand includes a sand that has a clay/silt content of about 1% by weight of the total sand composition.

4. The composition of claim 1, wherein the sand blend comprises exactly three different sand with one sand having a clay/silt content of about 1% by weight.

5. The composition of claim 1, wherein the sand blend comprises a first sand, a second sand and a third sand, with the first sand being about 60% by weight of the total sand blend, the second sand being about 20% by weight and the third sand being about 20% by weight, the first sand being a sand that has a clay/silt content of at least 1% by weight of the first sand.

6. The composition of claim 1, wherein the sand blend comprises a first sand, a second sand and a third sand, with the first sand being about 50% by weight of the total sand blend, the second sand being about 30% by weight and the third sand being about 20% by weight, the first sand being a sand that has a clay/silt content of at least 1% by weight of the first sand.

7. The composition of claim 1, wherein the hydrocarbon wax is present in an amount between about 5% and about 7% by weight.

8. The composition of claim 1, wherein the polymeric material includes at least two different polymeric materials.

9. The composition of claim 8, wherein the polymeric material comprises a polyester material.

10. The composition of claim 9, wherein the polymeric material only includes polyester material that is at least in the form of chopped polyester fabric.

11. The composition of claim 9, wherein the polyester material comprises a blend of two different polyester materials including chopped pieces of a polyester knit fabric and polyester fibers.

12. The composition of claim 8, wherein the polymeric material is about 2 percent by weight and includes a chopped pieces of polyester knit fabric that is 50% by weight of the polymeric material, with the remaining 50% by weight comprising polyester fibers.

13. The composition of claim 8, wherein the rubber comprises a plurality of virgin rubber pieces.

14. The composition of claim 1, wherein the sand comprises 88% by weight, the hydrocarbon wax 7% by weight, the polymeric material 2% by weight and the rubber 3% by weight, wherein the sand blend includes a sand that is present in a majority and has a clay/silt content of at least about 1% by weight of the total sand composition.

15. The composition of claim 1, wherein the sand comprises 90% by weight, the hydrocarbon wax 5% by weight, the polymeric material 2% by weight and the rubber 3% by weight, wherein the sand blend includes a sand that is present in a majority and has a clay/silt content of at least about 1% by weight of the total sand composition.

16. The composition of claim 1, wherein the composition comprises a uniform, homogenous mixture.

17. A composition for use as a sport or recreational surface comprising:
 about 88 to 90 percent by weight of a sand blend that is formed of at least three different sands mixed together, the sand blend including a first sand that is represents a majority by weight of the sand blend and has a clay/silt content of at least 1% by weight;
 about 5-7 percent by weight of a hydrocarbon wax;
 at least about 2 percent by weight of polymeric material; and
 at least about 3 percent by weight of rubber, the percentage by weight of each ingredient being based on the total weight of the composition;
 wherein the sand blend is mixed with the hydrocarbon wax, the polymeric material and the rubber to form the composition.

18. The composition of claim 17, wherein the polymeric material a polyester material.

19. A method of making a sport or recreational surface of the composition of claim 1 comprising the steps of:
 (a) admixing about 88 to 90 percent by weight of a sand blend; at least about 2 percent by weight of polymeric material; and at least about 3 percent by weight of rubber, wherein the sand blend is formed of at least three different sands mixed together, the sand blend including a first sand that is represents a majority by weight of the sand blend and has a clay/silt content of about 1% by weight;
 (b) heating about 5-7 percent by weight of a hydrocarbon wax until the wax has liquefied;
 (c) admixing the liquid wax into the mixture of step (a) to form a wax coated particulate composition, the percentage by weight of each ingredient being based on the total weight of the composition;
 (d) cooling the particulate composition of step (c);
 (e) optionally, breaking up the particulate composition into smaller particulates by hand or mechanically; and
 (f) depositing the cooled composition of steps (d) or (e) over an underlayer which is capable of drawing water away from an area.

* * * * *